R. BOEKLEN.
Apparatus for Emptying Cellars, Water-Closets, &c.
No. 142,200. Patented August 26, 1873.

Witnesses.
W. Boeklen
W. Omerle

Inventor.
Reinhold Boeklen
per
C. H. Watson & Co
atty

UNITED STATES PATENT OFFICE.

REINHOLD BOEKLEN, OF BROOKLYN, ASSIGNOR OF ONE-HALF HIS RIGHT TO JAKOB FUCHS, OF NEW YORK, N. Y.

IMPROVEMENT IN APPARATUS FOR EMPTYING CELLARS, WATER-CLOSETS, &c.

Specification forming part of Letters Patent No. 142,200, dated August 26, 1873; application filed June 6, 1873.

*To all whom it may concern:*

Be it known that I, REINHOLD BOEKLEN, of the city of Brooklyn, in the county of Kings and State of New York, have invented certain Improvements in Apparatus for Emptying Pools, Cellars, Water-Closets, and other places, of which the following is a specification:

This invention relates to the combination of a portable steam-boiler, a portable vacuum-vessel or pumping and suction chamber, with a cold-water sprinkler, and a detachable hose or suction pipe with stop-cocks, and a cold-water-supply pipe or reservoir, and certain connecting-pipes and stop-cocks between said boiler and vessel for conducting the steam to said vessel and to said hose separately and together, and between said vessel and furnace of said boiler for conducting and burning the foul air from said vessel, and between said cold-water supply, said sprinkler and vessel, and said suction-pipe, for condensing the steam in said vessel and hose, and cause vacuum and suction therein, and for stopping the outflow from said vessel when filled, and for discharging the contents in said hose back and cleaning the same. By this means a convenient apparatus for readily emptying pools, cellars, water-closets, and other places is had, which is portable, can empty and remove large quantities in a very short time, with very few operatives, and without causing objectionable odor, and to perform the work in day-time.

Figure 1:
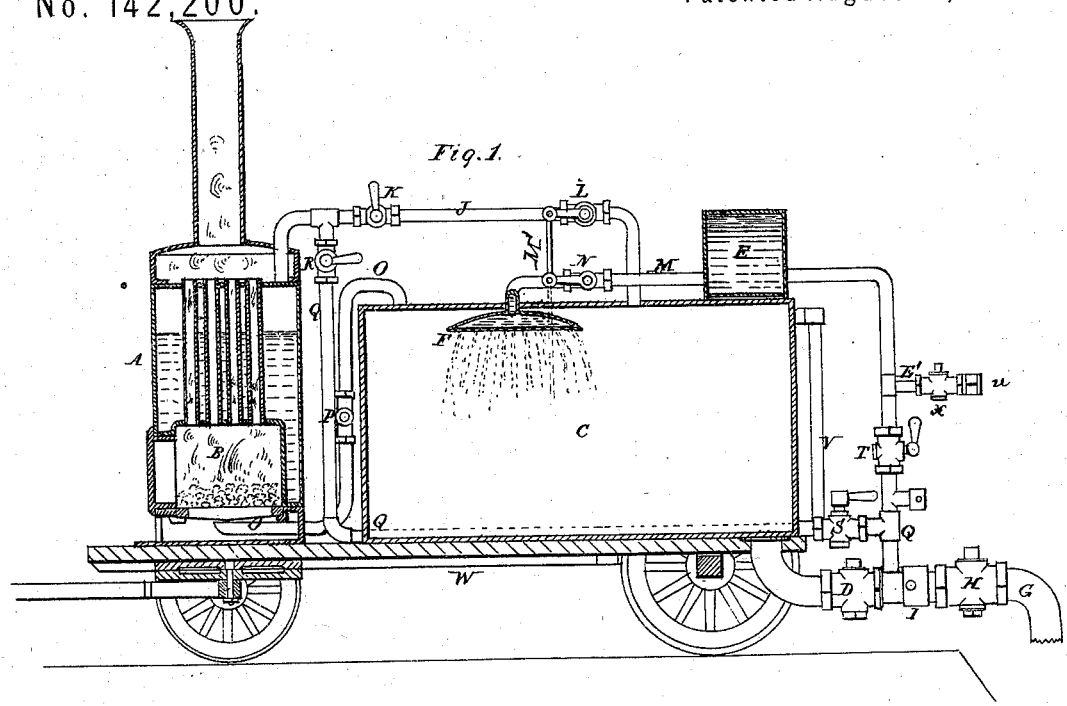
Figure 2:
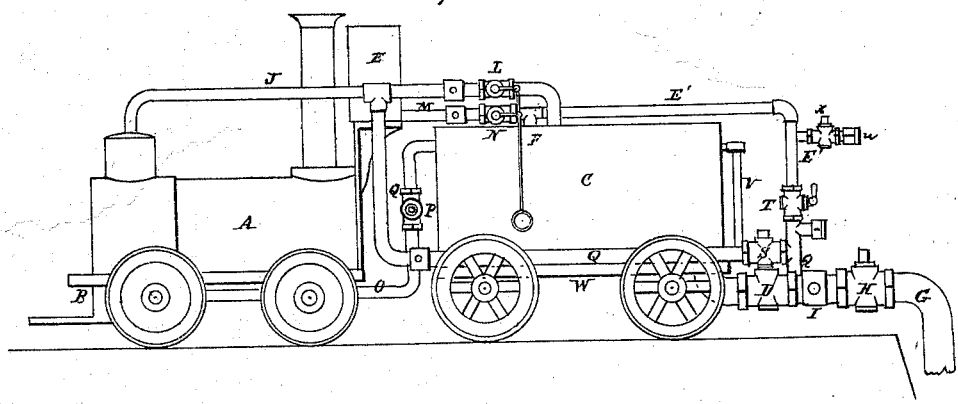

In the annexed drawing, Figure 1 represents a vertical longitudinal section of the apparatus according to my improvements. Fig. 2 is a side elevation of a modification of the same when the apparatus is used for emptying large places.

A represents a steam-boiler, and B its furnace. C represents an air-tight vessel of a suitable capacity, and suitably constructed for a vacuum-chamber. Its rear end or bottom has an elbow and stop-cock, D, with an end suitable for attaching a hose-coupling. Both the said boiler and vacuum vessel or chamber may be mounted on the same wagon when used to empty small places. When used for removing large quantities or for large places each should be mounted on a separate truck. E represents a water-supply-reservoir or pipe, and F a sprinkler attached on the inside of the vessel C. G is a hose furnished with a stop-cock, H, and a coupling, I, on its end, suitable for attaching the same to the elbow and stop-cock D. Between the boiler and vessel is a pipe, J, provided with stop-cocks K and L for conducting and stopping the flow of steam from the boiler to said vessel. Between the water supply or reservoir E and sprinkler F is a pipe, M, with a stop-cock, N, to cause the flow of water or stop the same into the vessel C. O represents a pipe with a stop-cock, P, to connect and disconnect the flow of air from the vessel C with the furnace B of the boiler. The pipe J has a branch pipe, Q, leading the steam to the outlet of the cock D and to the hose-pipe G, and it is furnished with stop-cocks R and S, and by means of the pipe E', leading also in the pipe Q, near its end entering the cock D, the water may be conducted into the hose G, and by means of the stop-cock T on the pipe E' the water is stopped from the hose. U represents a coupling for attaching a water-hose to supply the pipes E' and M. The vessel C is furnished with a vertical glass gage, V, for observing the filling of the vessel. Between the pipe E' and the coupling U is a stop-cock, X. W represents the truck, on which the boiler A and vessel C are mounted.

When the apparatus is used it is located as near as practicable to the place to be emptied. The hose G is then attached by means of the coupling I. The boiler A may have been fired beforehand, so that it may have ready steam, and the cocks R and K and P have been closed to stop the communication with the vessel from the boiler. The cocks N and T and X have been stopped, also, to disconnect the water-supply. When the steam is ready the cocks D and H are opened, and the loose end of the hose is placed nearly upon the bottom of the place to be pumped. The cock S is closed, and the cock P is opened. The cocks R and K, and finally L, are opened. By this means the steam passes from the boiler to the vessel C, and from the vessel into the hose G, forcing out the foul air through the pipe O into the furnace. After the foul air has escaped the cock P is stopped, and the cock X is opened to supply the pipe E' with water. Now the cock L is closed, and simultaneously with it is the cock N moved and opened, there being a link, M', between them. By this means a shower of cold water spreads from the sprinkler F into the vessel C, and thereby causing the steam therein and in the hose G to condense, and causing thereby vacuum and the suction through the hose and the filling of the vessel from the place to be emptied. As soon as the operator observes through the gage V the vessel C filled, or that the suction has ceased, the cock D is closed and the cock S is opened to force back the contents in the hose, and the cock T is finally opened and the cock S closed again, so that the last of the contents in said hose are forced out by the cold water, and that the hose is cleaned, after which the cock T is shut, and also the cock H, and the hose is uncoupled and removed. The apparatus now is brought to the place for discharging its contents, and, according to the contents, the steam-cock L may be opened to encourage the discharge, and the water-supply may be opened to clean out the vessel and hose. The apparatus can be brought back, and the operation of emptying renewed until the place is empty. When the apparatus is used for emptying large places it may be preferred to have the boiler on a truck for itself, and have a number of trucks with vessels C, and have the pipes between the boiler and vessel C made to uncouple, so that the boiler may operate on one vessel while another is going to be emptied.

What I claim as my invention, and desire to secure by Letters Patent, is—

1. The reservoir E, pipe M, stop-cock N, and sprinkler F, arranged in connection with vessel C, substantially as and for the purpose set forth.

2. The arrangement of pipes M and J, stop-cocks K L N with vessel C and boiler A, substantially as and for the purpose set forth.

3. The arrangement herein described of boiler A, vessel C, and pipes J Q O M, for the purpose set forth.

REINHOLD BOEKLEN.

Witnesses:
WILLIAM BOEKLEN,
WILLIAM OMERLE.